United States Patent
Todd et al.

(10) Patent No.: US 9,683,637 B2
(45) Date of Patent: Jun. 20, 2017

(54) TENSIONER WITH SPRING FORCE CONTROL IN A SECOND BORE

(71) Applicant: BorgWarner Inc., Auburn Hills, MI (US)

(72) Inventors: Kevin B. Todd, Freeville, NY (US); Dale N. Smith, Freeville, NY (US)

(73) Assignee: BorgWarner Inc., Auburn Hills, MI (US)

( * ) Notice: Subject to any disclaimer, the term of this patent is extended or adjusted under 35 U.S.C. 154(b) by 179 days.

(21) Appl. No.: 14/651,292

(22) PCT Filed: Dec. 2, 2013

(86) PCT No.: PCT/US2013/072574
§ 371 (c)(1),
(2) Date: Jun. 11, 2015

(87) PCT Pub. No.: WO2014/099327
PCT Pub. Date: Jun. 26, 2014

(65) Prior Publication Data
US 2015/0330482 A1 Nov. 19, 2015

Related U.S. Application Data

(60) Provisional application No. 61/738,547, filed on Dec. 18, 2012, provisional application No. 61/774,059, filed on Mar. 7, 2013.

(51) Int. Cl.
*F16H 7/08* (2006.01)
*F02B 67/06* (2006.01)

(52) U.S. Cl.
CPC ........... *F16H 7/0836* (2013.01); *F02B 67/06* (2013.01); *F16H 7/0848* (2013.01);
(Continued)

(58) Field of Classification Search
CPC ...... F02B 67/06; F16H 7/0836; F16H 7/0848; F16H 2007/0812; F16H 2007/0859; F16H 2007/0893
See application file for complete search history.

(56) References Cited

U.S. PATENT DOCUMENTS 3,574,418 A * 4/1971 Okabe .................... B62D 55/30
267/34
4,117,813 A 10/1978 Yamashita et al.
(Continued)

FOREIGN PATENT DOCUMENTS

DE 2008472 2/1970
DE 20202663 U1 2/2003
(Continued)

OTHER PUBLICATIONS

International Search Report for PCT/US2013/071793 mailed on Mar. 4, 2014; 9 pages.
(Continued)

*Primary Examiner* — William E Dondero
*Assistant Examiner* — Robert T Reese
(74) *Attorney, Agent, or Firm* — Brown & Michaels, PC

(57) ABSTRACT

A tensioner for tensioning a chain span which uses two pistons. The movement of the two pistons may be coupled together. The first piston provides damping to the chain span and a second piston provides variable, dominant and automatically adjusting spring force to the chain span. The tensioner automatically adjusts the mean tension force to keep the chain tension as low as possible without sacrificing chain control, significantly improving drive efficiency at new chain conditions and conditions with dynamic loads.

20 Claims, 10 Drawing Sheets

(52) U.S. Cl.
CPC .......... *F16H 2007/0806* (2013.01); *F16H 2007/0812* (2013.01); *F16H 2007/0859* (2013.01); *F16H 2007/0893* (2013.01)

(56) References Cited

U.S. PATENT DOCUMENTS

| | | | |
|---|---|---|---|
| 4,411,638 A | 10/1983 | Wilson | |
| 4,557,707 A | 12/1985 | Thomey | |
| 4,767,383 A | 8/1988 | St. John | |
| 5,109,813 A | 5/1992 | Trzmiel et al. | |
| 5,431,602 A | 7/1995 | Hendriks et al. | |
| 5,538,478 A | 7/1996 | Nakakubo et al. | |
| 5,606,941 A | 3/1997 | Trzmiel et al. | |
| 5,657,725 A | 8/1997 | Butterfield et al. | |
| 5,700,216 A | 12/1997 | Simpson et al. | |
| 5,720,683 A | 2/1998 | Patton | |
| 5,913,742 A | 6/1999 | Nakamura | |
| 5,993,342 A | 11/1999 | Wigsten et al. | |
| 6,117,033 A | 9/2000 | Simpson | |
| 6,196,939 B1 | 3/2001 | Simpson | |
| 6,205,965 B1 | 3/2001 | Stephan et al. | |
| 6,244,982 B1 | 6/2001 | Merelli | |
| 6,352,487 B1 | 3/2002 | Tada | |
| 6,383,103 B1 | 5/2002 | Fujimoto | |
| 6,398,682 B1 | 6/2002 | Suzuki et al. | |
| 6,592,479 B2 | 7/2003 | Nakakubo et al. | |
| 6,609,985 B2 | 8/2003 | Todd et al. | |
| 6,634,973 B1 | 10/2003 | Simpson et al. | |
| 6,716,124 B2 | 4/2004 | Markley | |
| 6,899,650 B2 | 5/2005 | Okuda et al. | |
| 7,070,528 B2 | 7/2006 | Emizu et al. | |
| 7,189,175 B2 | 3/2007 | Maino | |
| 7,699,730 B2 | 4/2010 | Emizu et al. | |
| 8,197,369 B2 | 6/2012 | Mishima | |
| 2002/0022541 A1 | 2/2002 | Ullein et al. | |
| 2002/0160868 A1 | 10/2002 | Wigsten et al. | |
| 2002/0169042 A1 | 11/2002 | Kurohata et al. | |
| 2003/0070717 A1 | 4/2003 | Hashimoto et al. | |
| 2003/0171179 A1 | 9/2003 | Okuda et al. | |
| 2003/0216202 A1 | 11/2003 | Emizu et al. | |
| 2006/0063625 A1 | 3/2006 | Emizu et al. | |
| 2007/0243961 A1 | 10/2007 | Aimone | |
| 2008/0064546 A1 | 3/2008 | Ullein | |
| 2010/0093473 A1 | 4/2010 | Bulloch | |
| 2011/0015013 A1 | 1/2011 | Hofmann et al. | |
| 2011/0081997 A1 | 4/2011 | Markely | |
| 2012/0192821 A1 | 8/2012 | Herbert | |

FOREIGN PATENT DOCUMENTS

| | | |
|---|---|---|
| EP | 329855 A1 | 8/1989 |
| EP | 1001185 A1 | 5/2000 |
| EP | 1258655 A2 | 11/2002 |
| EP | 1302698 A | 4/2003 |
| EP | 1319868 A2 | 6/2003 |
| EP | 1323950 A1 | 7/2003 |
| EP | 1621798 A2 | 2/2006 |
| JP | 4-126052 A | 11/1992 |
| JP | 9303506 A | 11/1997 |
| JP | 2001021013 A | 1/2001 |
| JP | 2001032897 A | 2/2001 |
| JP | 2002054700 A | 2/2002 |
| JP | 20020256916 A | 9/2002 |
| JP | 2003027953 A | 1/2003 |
| JP | 2005098383 A | 4/2005 |
| JP | 2005282672 A | 10/2005 |
| JP | 2007211919 A | 8/2007 |
| JP | 2008303974 A | 12/2008 |
| KR | 19980060447 A | 10/1998 |
| KR | 20050055927 A | 6/2005 |
| KR | 1020090058301 A | 6/2009 |
| WO | 2007091437 A1 | 8/2007 |
| WO | 2009003825 A1 | 1/2009 |
| WO | 2013043373 | 3/2013 |

OTHER PUBLICATIONS

International Search Report for PCT/US2013/072574 mailed on Mar. 20, 2014; 12 pages.
International Search Report for PCT/US2014/019329; Jun. 11, 2014; 13 pgs.
International Search Report for PCT/US2012/053830; Feb. 25, 2013; 10 pgs.
Extended European International Search Report for PCT/US2010/048055; Feb. 21, 2013; 6 pages.
International Search Report; PCT/JP2007/051326; Apr. 18, 2007, 9 pages.

* cited by examiner

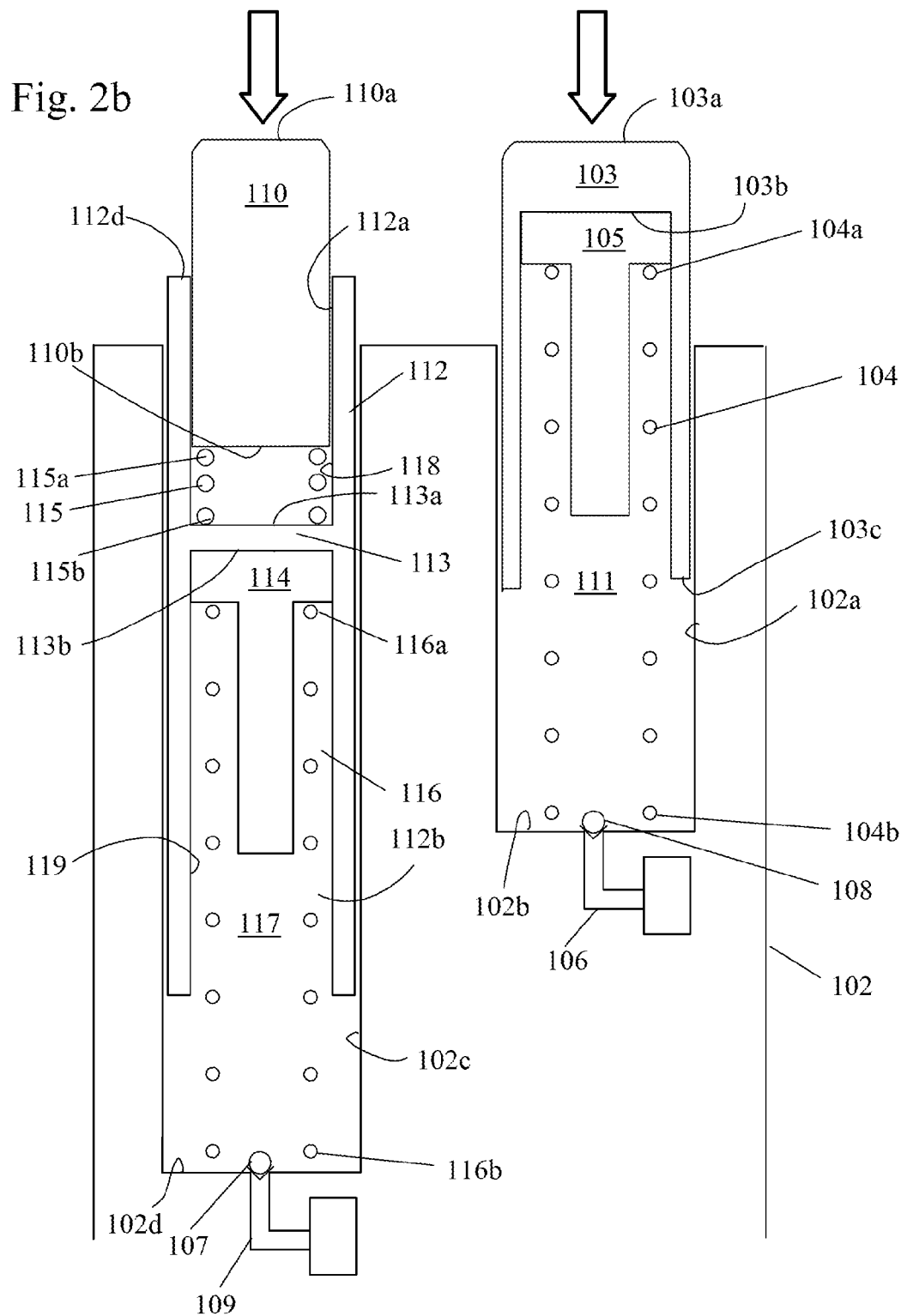

TENSIONER WITH SPRING FORCE CONTROL IN A SECOND BORE

BACKGROUND OF THE INVENTION

Field of the Invention

The invention pertains to the field of tensioners. More particularly, the invention pertains to a tensioner with spring force control in a second bore of the housing.

Description of Related Art

Generally, in timing chains for valve drives of internal combustion engines, camshaft chains in use for a camshaft-camshaft drive, and balancer chains have tensioners that are used on the slack side of a chain to take up slack in the chain and to apply tension to the chain.

During operation, a piston of the tensioner presses against the chain to maintain tension in the chain. When tension in the chain increases during operation due to resonance of a chain span, a high load from the chain acts on the piston of the tensioner, causing the piston to extend as the tensioner pumps up to keep the tension in the chain.

Chain drive tensioner spring force is often too high for most operating conditions because the spring force needs to be sufficient to handle worst case operating conditions of the tensioner system. The effectiveness of the tensioner and the overall system behavior and efficiency could be improved if the tensioner spring force could be varied with operating conditions, taking into account wear and stretching that occurs in the chain during the life of the chain.

SUMMARY OF THE INVENTION

A tensioner for tensioning a chain span which uses two pistons. The movement of the two pistons may be coupled together. The first piston provides damping to the chain span and a second piston provides variable and automatically adjusting spring force to the chain span. The tensioner automatically adjusts the mean tension force to keep the chain tension as low as possible without sacrificing chain control, significantly improving drive efficiency at new chain conditions and conditions with dynamic loads.

BRIEF DESCRIPTION OF THE DRAWING

FIG. 2b shows a schematic of a tensioner tensioning a chain in response to high dynamic load.

DETAILED DESCRIPTION OF THE INVENTION

FIGS. 1-7 show tensioners using a passive control system to maintain tension of a chain span or belt. Passive control is defined as a system in which no feedback is used to regulate the position of a first piston relative to a second piston or between the position of a moveable sleeve relative to the position of a piston.

The tensioner systems of the present invention include a tensioner (described in further detail below) for a closed loop chain drive system used in an internal combustion engine. It may be utilized on a closed loop power transmission system between a driveshaft and at least one camshaft or on a balance shaft system between the driveshaft and a balance shaft. The tensioner system may also include an oil pump and be used with fuel pump drives. Additionally, the tensioner system of the present invention may also be used with belt drives.

Figure 1:
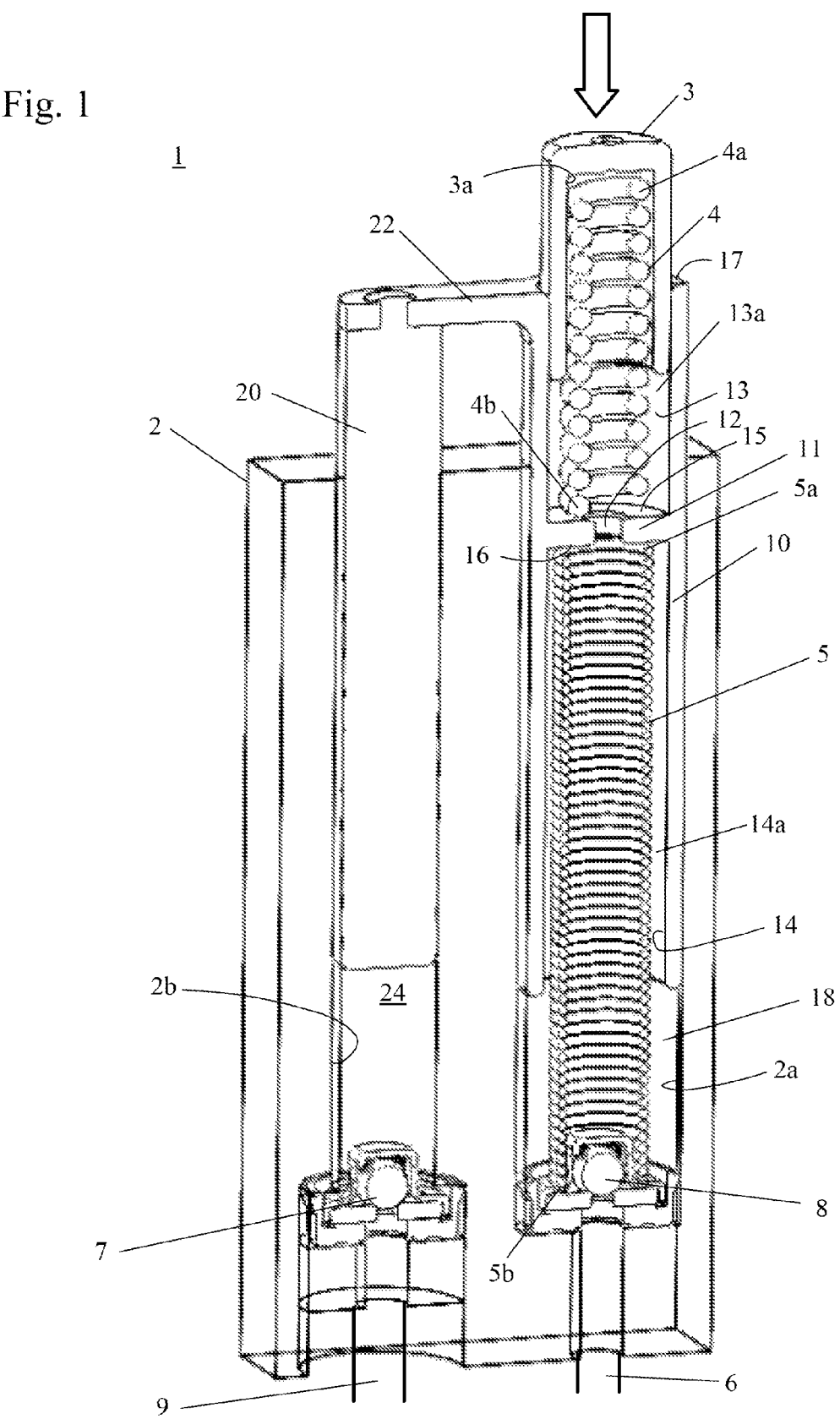
FIG. 1 shows a schematic of a tensioner of a first embodiment of the present invention.

FIG. 1 shows tensioner systems using passive control to maintain the position of a moveable sleeve 10 relative to a piston 3. Passive control is defined as a system in which no feedback is used to regulate the position of a movable sleeve 10 relative to a piston 3 of the tensioner 1. The passive system is in contrast to an active control system in which real time feedback of components of the engine are used to regulate the position of the movable sleeve 10.

The tensioner 1 includes a housing 2 having a first axially extending piston bore 2a. Received within the bore 2a of the housing 2 is a moveable sleeve 10. The moveable sleeve 10 has a first open end 13a and a second open end 14a which are separated by an inner flange 11 with a through hole 12. The first open end 13a is defined by a top inner diameter portion 13, a top surface 15 of the inner flange 11 and the second open end 14a is defined by a bottom inner diameter portion 14 and a bottom surface 16 of the inner flange 11. The through hole 12 of the inner flange 11 connects the first open end 13a with the second open end 14a. A top surface 17 of the moveable sleeve 10 is exposed to atmospheric pressure of the engine.

Received within the first open end 13a of the moveable sleeve 10, defined by the top inner diameter portion 13 and the top surface 15 of the inner flange 11, is a hollow piston 3. Within the hollow piston 3 is a piston spring 4 biasing the piston 3 outwards from the housing 2. The piston spring 4 has a first end 4a in contact with the inner portion 3a of the hollow piston 3 and a second end 4b in contact with a top surface 15 of the inner flange 11 of the moveable sleeve 10. It should be noted that while the piston 3 is shown as being hollow, the present invention could also apply to a solid piston, with the piston spring connecting the end of the piston.

Received within the second opening 14a of the moveable sleeve 10, defined by the bottom inner diameter portion 14 and the bottom surface 16 of the inner flange 11, is a bias sleeve spring 5. The first end 5a of the bias sleeve spring 5 is in contact with a bottom surface 16 of the inner flange 11 of the moveable sleeve 10 and the second end 5b of the bias sleeve spring 5 is in contact with a check valve 8 of the bore 2a. The bias sleeve spring 5 provides a bias force to maintain some outward force on the moveable sleeve 10. A pressure chamber 18 is formed between the top inner diameter portion 13 of the moveable sleeve 10, the bottom inner diameter portion 14 of the moveable sleeve 10, the bore 2a of the housing, and the interior 3a of the piston 3. The through hole 12 is present in the inner flange 11 and allows fluid to flow from the second opening 14a to the first opening 13a of the moveable sleeve 10.

At the bottom of the bore 2a is an inlet supply line 6 which provides fluid to the pressure chamber 18 through an inlet check valve 8.

At least a portion of the moveable sleeve 10 is coupled to a second piston 20 received within a second axially extending piston bore 2b of the housing 2 through a coupling 22. While the second piston 20 is shown as being connected to the top of the moveable sleeve 10, the connection can occur on other parts of the moveable sleeve 10. The coupling 22 may be a sleeve tab as shown in FIG. 1 or a flexible linkage. The second piston 20 does not need to be rigid or hard connection to the moveable sleeve 10 and can bias the moveable sleeve 10 from any contact point on the moveable sleeve 10.

Furthermore, while the second bore 2b of the housing 2 is shown as being parallel to the first bore 2a, the second bore 2b may be perpendicular to the first bore 2a or at some other angle relative to the first bore 2a.

In an alternate embodiment, the orientation of the second piston 20 could be inverted or reoriented to act on a coupling 22 that then biases the moveable sleeve 10, outwards from the housing 2.

In yet another embodiment, the secondary piston 20 could also have a flange around its outer diameter with a chamber on either side as shown in International Application No. PCT/US2012/053830, which is hereby incorporated by reference.

At the bottom of the second bore 2b is an inlet supply line 9 which provides fluid through an inlet check valve 7 to a pressure chamber 24 formed between the second piston 20 and the bore 2b of the housing 2. The coupling 22 between the second piston 20 and the moveable sleeve 10 is such that, if the second piston 20 is moved, the moveable sleeve 10 moves and vice versa. The fluid from the inlet supply line 9 may also be controlled by a control valve (not shown).

When the tensioner 1 is tensioning a new chain, during operation, fluid is supplied to the first hydraulic chamber 18 from an inlet supply line 6 through an inlet check valve 8 to pressurize the first hydraulic chamber 18 and bias the piston 3 outward from the housing 2 in addition to the spring force from piston spring 4 biasing a span of the closed loop chain.

The supply providing fluid to the first bore 2a through the first inlet supply line 6 may be the same as the supply providing fluid to second bore 2b through inlet supply line 9. Alternatively, the supply supplying fluid to the first bore 2a and the second bore 2b of the housing 2 can be different.

When the tensioner 1 is tensioning a worn chain without high load, during operation, fluid is supplied to the first hydraulic chamber 18 through an inlet check valve 8 from an inlet supply line 6 to pressurize the first hydraulic chamber 18 and bias the piston 3 outward from the housing 2. The piston 3 is also biased outward from the housing 2 by the spring 4 to bias a span of the closed loop chain. As the chain wears, the piston 3 has to be biased further outwards from the housing 2 in order to adequately tension the chain. The bias sleeve spring 5 within the second open end 14a of the moveable sleeve 10 biases the inner flange 11 outward from the housing 2, moving the end 4b of the spring 4 further outwards from the housing 2 and towards the chain.

When the tensioner 1 is tensioning a worn chain during high dynamic chain load, the high dynamic load force from the chain (shown by the arrow) pushes the piston 3 inwards towards the housing 2 and then outwards from the housing 2, moving the second piston 20 inwards and outwards as well, pumping up the pressure or pressurizing the second pressure chamber 24, by drawing fluid through the inlet check valve 7 in the second bore 2b of the housing 2. The pressurization of the second pressure chamber 24 in the second bore 2a moves the second piston 20 and thus the moveable sleeve 10 outwards from the housing 2. The movement of the moveable sleeve 10 causes the inner flange 11 of the moveable sleeve 10 to exert an outward force on the piston 3 through the piston spring 4, opposing the inward force of the dynamic load.

Once the high load is removed from the piston 3, the second pressure chamber 24 is depressurized and fluid leaks out to the engine through clearance between the second bore 2b and the second piston 20.

Within the tensioner system of the present invention, movement of the moveable sleeve 10 moves the second end 4b of the piston spring 4 biasing the piston 3 outwards from the housing 2, and therefore the spring force acting on the piston 3 is variable allowing the piston 3 to continually tension the chain, even when the chain becomes worn and stretched.

Furthermore, a vent or pressure relief valve (not shown) may be present within the hollow piston 3.

Seals (not shown) may be present between the bore 2a and the moveable sleeve 10 or any other place within the tensioner as necessary.

Hydraulic stiffness of the tensioner is created by the pressure chambers 18 and 24 of the tensioner and substantially prevents inward movement of the piston 3 and the moveable sleeve 10 towards the housing 2 when the chain span is under load.

In an alternate embodiment, the moveable sleeve 10 may be received within another sleeve in the first bore 2a to aid in eliminating pressure that could result in undesired pump-up.

It should be noted that this is a mean position control device. It is unlikely that frequency response would be sufficient to dynamically vary the moveable sleeve position within an engine cycle. Pressure acting on the bottom surfaces of movable sleeve 10 may result in undesired pump-up. In an alternate embodiment, the moveable sleeve 10 may be received within another sleeve in the first bore 2a to aid in eliminating pressure that could result in undesired pump-up. In another alternate embodiment, the piston 3 may fit over the outside of moveable sleeve 10 so the top and bottom surfaces of the moveable sleeve 10 are exposed to the same pressure.

Figure 2A:
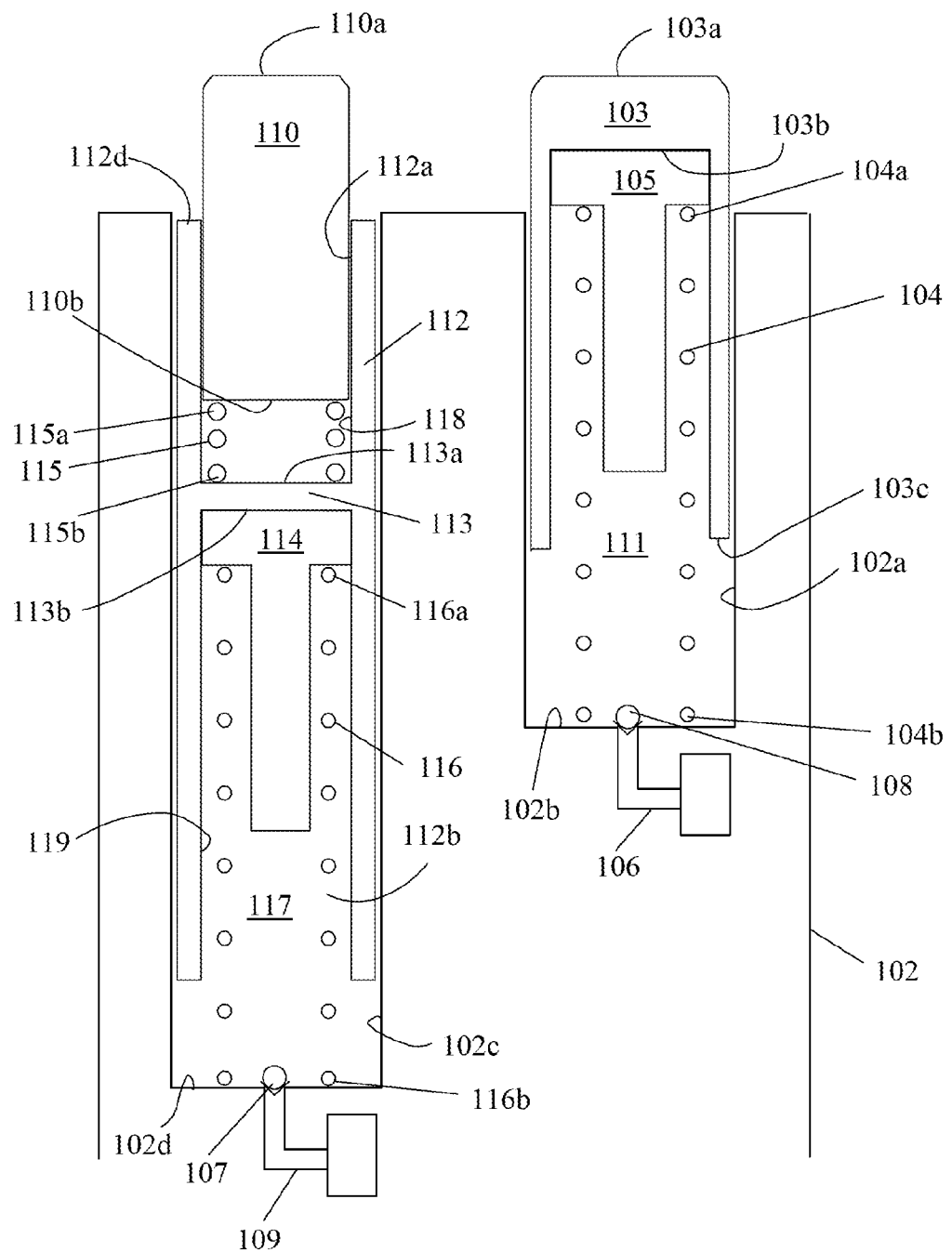
FIG. 2a shows a schematic of a tensioner of a second embodiment tensioning a chain under normal operating conditions.

FIGS. 2a-2b shows a tensioner of a second embodiment using passive control to tension a chain under various conditions; FIG. 2a is tensioning a chain without high loads; and FIG. 2b is tensioning a chain with high load.

The tensioner includes a housing 102 having a first axially extending bore 102a parallel to a second axially extending bore 102b. While the second bore 102c of the housing 102 is shown as being parallel to the first bore 102a, the second bore 102c may be perpendicular to the first bore 102a or at some other angle relative to the first bore 102a.

Slidably received within the first axially extending bore 102a is a first piston 103. The first piston 103 has a body with a first end 103a, a second end 103c, and a hollow interior 103b. Present within the hollow interior 103b of the first piston 103 is a first piston spring 104. The first piston spring 104 has a first end 104a in contact with the interior 103b of the first piston 103 or a volume reducer 105 and a second end 104b in contact with a bottom 102b of the first axially extending bore 102a of the housing 102. A first pressure chamber 111 is formed between the first piston 103 and the first axially extending bore 102a. Fluid is supplied to the first pressure chamber 111 through a first supply 106 through an inlet check valve 108. The first piston 103 is biased outwards from the housing 102 to bias a chain or belt through the first end 103a of the first piston 103 by the force of the first piston spring 104 and the pressure of oil in the first pressure chamber 111.

Alternatively, the first piston 103 may not be hollow and the first piston spring 104 would contact the body of the first piston 103 and the bottom 102b of the first axially extending bore 102a.

The second axially extending bore 102c receives a moveable sleeve 112. The moveable sleeve 112 has a first open end 112a and a second open end 112b which are separated by an inner flange 113. The first open end 112a of the moveable sleeve 112 is defined by a top inner diameter portion 118 and a top surface 113a of the inner flange 113. The second open end 112b of the moveable sleeve 112 is defined by a bottom inner diameter portion 119 and a bottom surface 113b of the inner flange 113. The top surface 112d of the moveable sleeve 112 and top surface 113a of the inner flange is exposed to atmospheric pressure of the engine.

Figure 7:
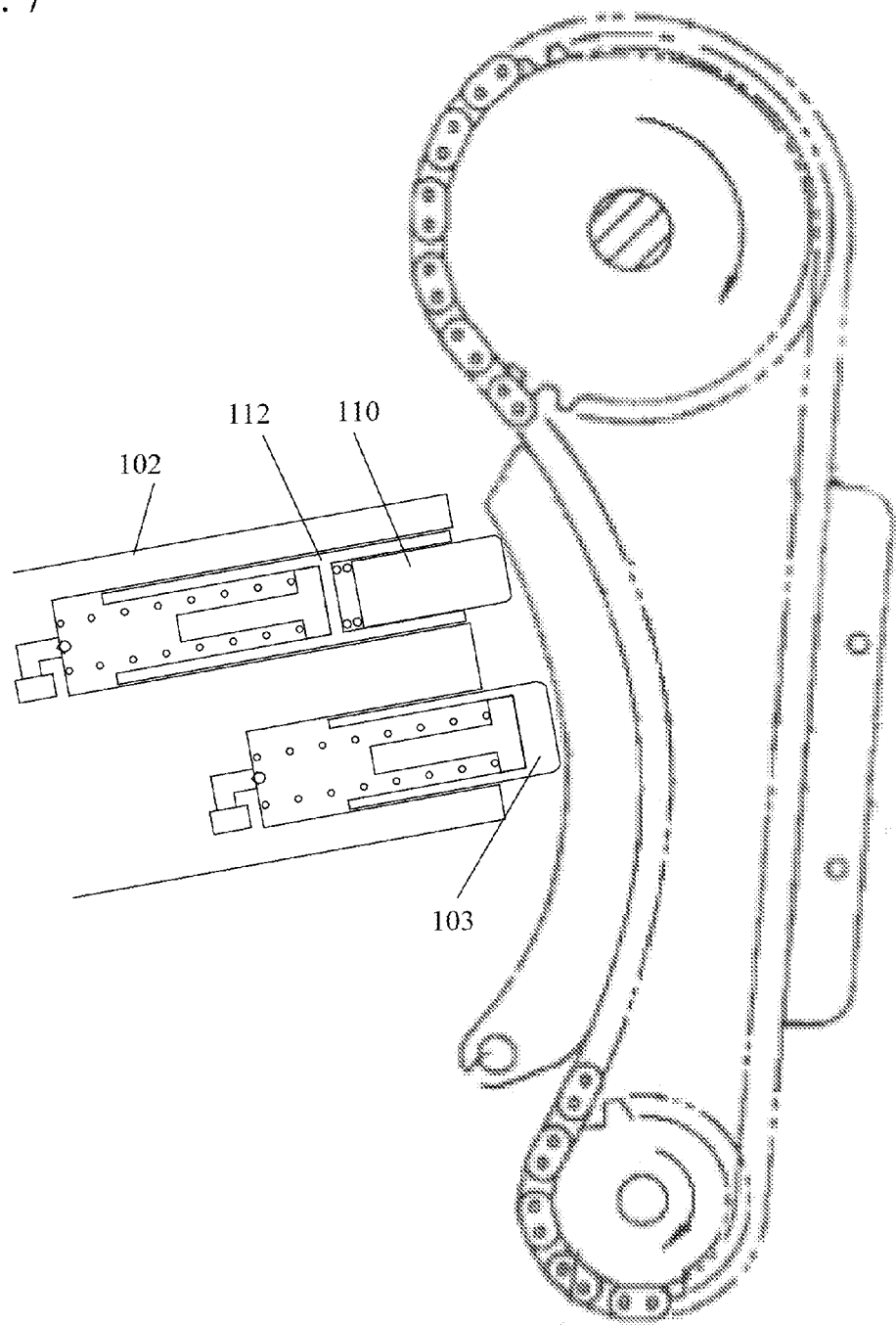
FIG. 7 shows an example of the tensioner of the first embodiment tensioning a chain through an arm.

Received within the first open end 112a of the moveable sleeve 112 is a second piston 110 having a body with a first end 110a and a second end 110b. A second piston spring 115 biases the second piston 110 outwards from the first open end 112a of the moveable sleeve 112 of the housing 102 so that the first end 110a of the second piston 110 can apply a force to the chain 400, preferably through an arm 401 as shown in FIG. 7. The second piston spring 115 has a first end 115a in contact with the second end 110b of the second piston 110 and a second end 115b in contact with the top surface 113a of the inner flange 113.

Alternatively, the second piston 110 may be hollow and the first end 110a of the second piston spring would contact a hollow interior of the second piston 110.

Received within the second open end 112b of the moveable sleeve 112 is a bias sleeve spring 116 and an optional volume reducer 114. The first end 116a of the bias sleeve spring 116 is in contact with a bottom surface 113b of the inner flange 113 or the volume reducer 114 and a second end 116b of the bias sleeve spring 116 is in contact with a bottom 102d of the second axially extending bore 102c of the housing 102. The bias sleeve spring 116 maintains the position of the moveable sleeve 112 within the second axially extending bore 102c and prevents the moveable sleeve 112 from bottoming out within the second axially extending bore 102c. The bias sleeve spring 116 preloads the second piston spring 115, in other words, moving the second end 115b of the second piston spring 115 outwards from the housing 102. A second high pressure chamber 117 is formed between the bottom inner diameter portion 119 of the moveable sleeve 112, the bottom surface 113b of the inner flange 113, and the bottom 102d of the second axially extending bore 102c. The volume reducer 114 may also be present within this chamber 117. There is no fluid communication between the first open end 112a and the second open end 112b of the moveable sleeve 112 save for any leakage that may occur from the second high pressure chamber 117.

Fluid is supplied to the second high pressure chamber 117 through an inlet supply line 109 and preferably a check valve 107. The inlet supply 109 may or may not be connected to the inlet supply line 106.

The second piston spring 115 has a greater spring rate or spring constant than the first piston spring 104 or the bias sleeve spring 116.

Since there are two pistons 110, 103 to tension the chain span or belt, the leakage of the first pressure chamber 111 can be increased (as opposed to a conventional hydraulic tensioner where a certain mean pressure must be maintained within the pressure chamber to control the chain) to provide additional damping. The mean force required for chain control is supplied by the second piston 110 in the second axially extending bore 102c.

When the tensioner is tensioning a new chain as shown in FIG. 2a, during operation, fluid is supplied to the first pressure chamber 111 from the first inlet supply 106 and through an inlet check valve 108 and biases the first piston 103 outwards from the housing 102 in addition to the spring force of the first piston spring 104, biasing a span of the closed loop chain 400 or belt as shown in FIG. 7. At the same time, the second piston 110 is also biased outwards from the moveable sleeve 112 by the second piston spring 115 to bias a span of the closed loop chain 400 or belt. Ideally, the first piston 103 and the second piston 110 are biased outwards from the housing 102 approximately the same amount. In other words, the first ends 103a, 110a of the first and second pistons 103, 110 are aligned as shown in FIGS. 2a and 7.

When the tensioner is tensioning a worn chain without high load, during operation, fluid is supplied to the first pressure chamber 111 through the first inlet supply 106 and through an inlet check valve 108 and biases the first piston 103 outwards from the housing 102 in addition to the spring force of the first piston spring 104, biasing a span of the closed loop chain 400 or belt. At the same time, the second piston 110 is also biased outwards from the moveable sleeve 112 by the second piston spring 115 due to the movement of the moveable sleeve 112 by the bias sleeve spring 116 to bias the span of the closed loop chain 400 or belt. As the chain wears, additional slack is present in the chain span and the first piston 103 and second piston 110 would need to be extended further outwards from the housing 102 to bias and adequately tension the chain 400.

When the tensioner is tensioning a chain during high dynamic chain load, the high dynamic load force from the chain (shown by the arrow) pushes the first piston 103 and the second piston 110 inwards towards the housing 102 and then outwards from the housing 102, pumping up the pressure or pressurizing the second pressure chamber 117, by drawing fluid through the inlet check valve 107 into the second bore 102c of the housing 102. The pressurization of the second pressure chamber 117 in the second bore 102c moves the moveable sleeve 112 outwards from the housing 102. The movement of the moveable sleeve 112 causes the inner flange 113 of the moveable sleeve 112 to exert an outward force on the second piston 110 through the second piston spring 115, opposing the inward force of the dynamic load.

Once the inward force of the dynamic load has been opposed, fluid within the second pressure chamber 117 leaks to the engine through the second axially extending bore 102c or through the volume reducer 114. This leakage reduces the mean pressure present within the second pressure chamber 117.

It should be noted that at all operating conditions, the pressure in the second pressure chamber 117 will pump up to maintain a minimum preload in the second piston spring 115. When the force or preload in the second piston spring 115 gets too low, the moveable sleeve 112 moves out from the housing, due to the bias sleeve spring 116 and pressure in the second pressure chamber 117 and draws more oil in through the inlet check valve 107.

Therefore, the first piston 103 in the first axially extending bore 102a provides the dominant damping of the chain span 400 or belt and the second piston 110 in the second axially extending bore 102c provides the dominant and automatically adjusting spring force. The tensioner of the present invention automatically adjusts the mean tension force to keep the chain tension as low as possible without sacrificing chain control, significantly improving drive efficiency at new chain conditions and conditions with dynamic loads.

Figure 3A:
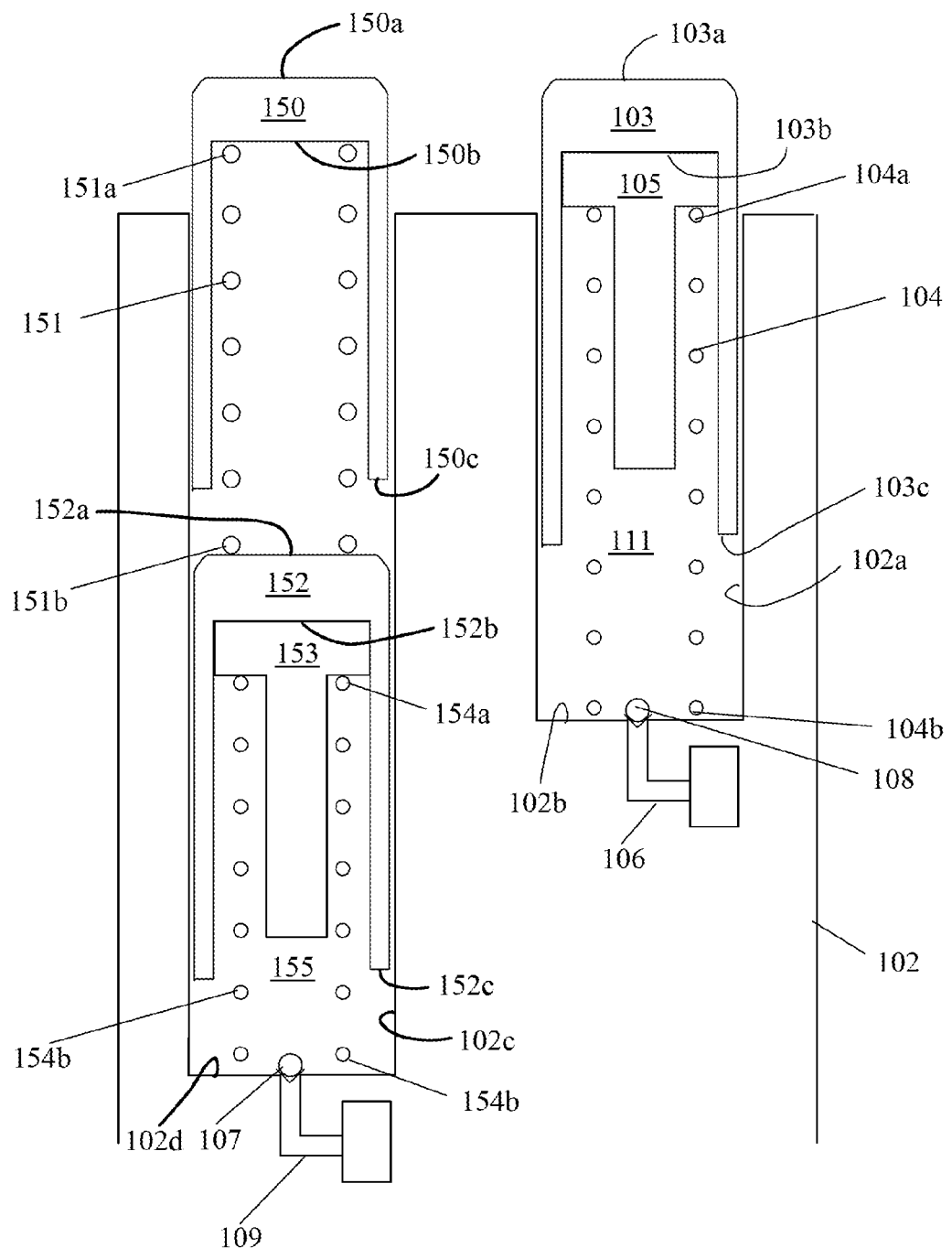
FIG. 3a shows a schematic of a tensioner of a third embodiment tensioning a chain under normal operating conditions.
Figure 3B:
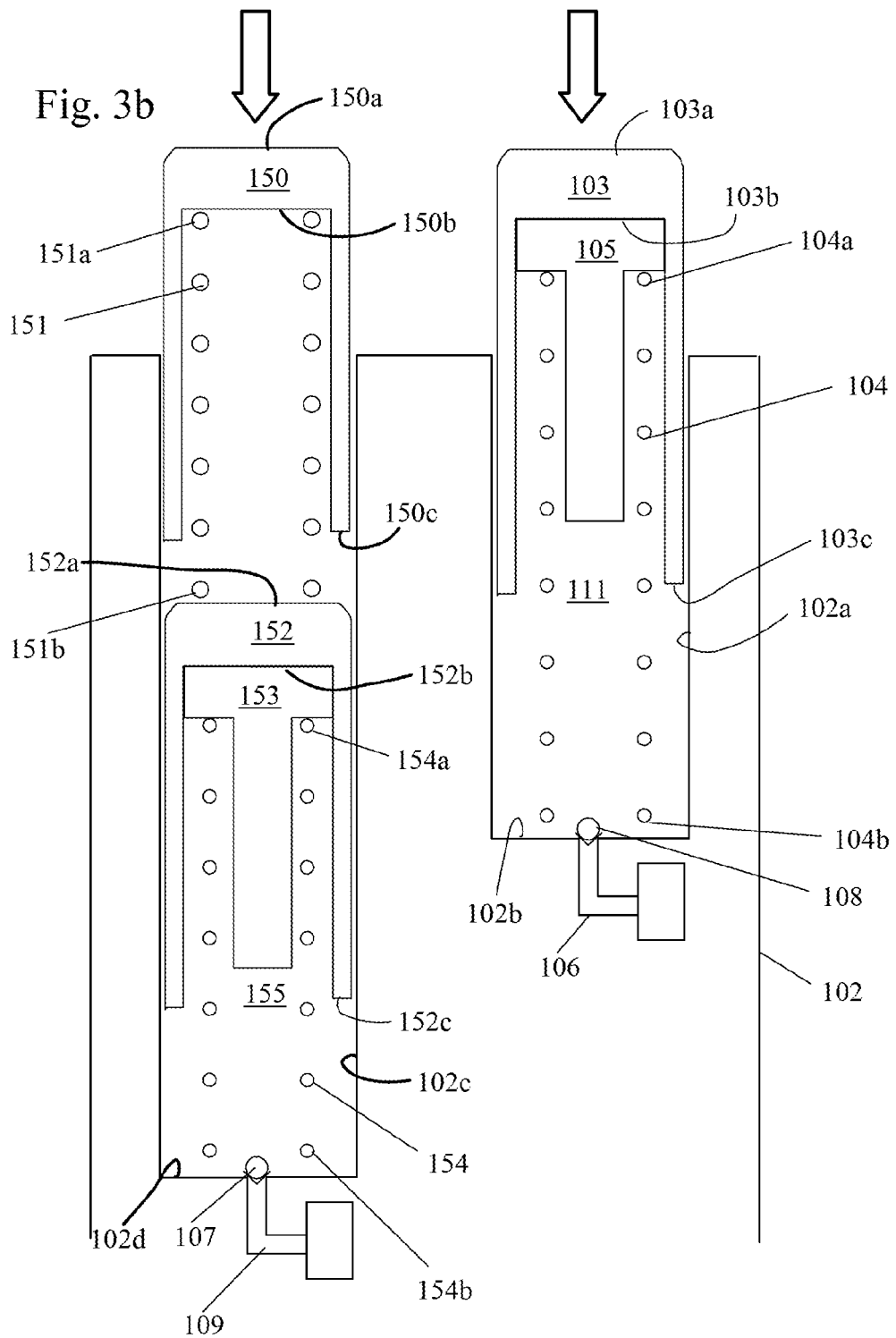
FIG. 3b shows a schematic of a tensioner tensioning a chain in response to high dynamic load.

FIGS. 3a-3b shows a tensioner of a third embodiment using passive control to tension a chain under various conditions; FIG. 3a is tensioning a chain without high loads; and FIG. 3b is tensioning a chain with high load.

The tensioner includes a housing 102 having a first axially extending bore 102a parallel to a second axially extending bore 102c. While the second bore 102c of the housing 102 is shown as being parallel to the first bore 102a, the second bore 102c may be perpendicular to the first bore 102a or at some other angle relative to the first bore 102a.

Slidably received within the first axially extending bore 102a is a first piston 103. The first piston 103 has a body with a first end 103a, a second end 103c, and a hollow interior 103b. Present within the hollow interior 103b of the first piston 103 is a first piston spring 104. The first piston spring 104 has a first end 104a in contact with the interior 103b of the first piston 103 or a volume reducer 105 and a second end 104b in contact with a bottom 102b of the first axially extending bore 102a of the housing 102. A first pressure chamber 111 is formed between the first piston 103 and the first axially extending bore 102a. Fluid is supplied to the first pressure chamber through a first supply 106 through an inlet check valve 108. The first piston 103 is biased outwards from the housing 102 to bias the chain through the first end 103a of the first piston by the force of the first piston spring 104 and the pressure of oil in the first pressure chamber 111.

Alternatively, the first piston 103 may not be hollow and the first piston spring 104 would contact the body of the first piston 103 and the bottom 102b of the first axially extending bore 102a.

The second axially extending bore 102c slidably receives a second external piston 150 and a third piston 152. The second external piston 150 has a body with a first end 150a, a second end 150c, and a hollow interior 150b. Present within the hollow interior 150b is a second piston spring 151 for biasing the second piston 150 outwards from the housing 102. The second piston spring 151 has a first end 151a in contact with the interior 150b of the second external piston 150 and a second end 151b in contact with a first end 152a of the third piston 152. Alternatively, the second external piston 150 may not be hollow and the first end 151a of the second piston spring 151 would contact the body of the second external piston 150.

The third piston 152 has a body with a first end 152a, a second end 152c, and a hollow interior 152b. Present within the hollow interior 152b is a third piston spring 154 for biasing the third piston 152 outwards from the housing and preloading the second piston spring 151, in other words moving the second end 151b of the second piston spring 152 outwards from the housing 102. The third piston spring 154 has a first end 154a in contact with the hollow interior 152b or a volume reducer 153 and the second end 154b is in contact with the bottom 102c of the second axially extending bore 102c of the housing 102.

A second high pressure chamber 155 is formed between the hollow interior 152b, the second axially extending bore 102c, and the third piston spring 154. Fluid is supplied to the second high pressure chamber 155 through an inlet supply 109 and preferably a check valve 107. The inlet supply 109 may or may not be connected to the inlet supply line 106.

There is no fluid communication between the hollow interior 150b of the second piston 150 and the second high pressure chamber 155 save for any leakage that may occur.

The second piston spring 151 has a greater spring rate or spring constant than the first piston spring 104 and the third piston spring 154.

Since there are two pistons 150, 103 to tension the chain span or belt, the leakage of the first pressure chamber 111 can be increased (as opposed to a conventional hydraulic tensioner where a certain mean pressure must be maintained within the pressure chamber to control the chain) to provide additional damping. The mean force required for chain control is supplied by the second piston 150 in the second axially extending bore 102c.

When the tensioner is tensioning a new chain as shown in FIG. 3a, during operation, fluid is supplied to the first pressure chamber 111 from the first inlet supply 106 and through an inlet check valve 108 and biases the first piston 103 outwards from the housing 102 in addition to the spring force of the first piston spring 104, biasing a span of the closed loop chain 400 or belt as shown in FIG. 7. At the same time, the second piston 150 is also biased outwards from the second axially extending bore 102c by the second piston spring 151 to bias a span of the closed loop chain 400 or belt. Ideally, the first piston 103 and the second piston 150 are biased outwards from the housing 102 approximately the same amount. In other words, the first ends 103a, 150a of the first and the second pistons 103, 150 are aligned as shown in FIGS. 3a and 7.

When the tensioner is tensioning a worn chain without high load, during operation, fluid is supplied to the first pressure chamber 111 through the first inlet supply 106 and through an inlet check valve 108 and biases the first piston 103 outwards from the housing 102 in addition to the spring force of the first piston spring 104, biasing a span of the closed loop chain 400 or belt. At the same time, the second piston 150 is also biased outwards further through the second piston spring 151 due to the movement of the third piston 152 by the third piston spring 154 to bias the span of the closed loop chain 400 or belt. As the chain wears further, additional slack is present in the chain span and the first piston 103 and second piston 150 would need to be extended further outwards from the housing 102 to bias and adequately tension the chain 400.

When the tensioner is tensioning a chain during high dynamic chain load, the high dynamic load force from the chain (shown by the arrow) pushes the first piston 103 and the second piston 150 inwards towards the housing 102 and then outwards from the housing 102, pumping up the pressure or pressurizing the second pressure chamber 155, by drawing fluid through the inlet check valve 107 into the second bore 102c of the housing 102. The pressurization of the second pressure chamber 155 in the second bore 102c moves the third piston 152 outwards from the housing 102. The movement of the third piston 152 causes the first end 152a of the third piston 152 to exert an outward force on the second piston 150 through the second piston spring 151, opposing the inward force of the dynamic load.

Once the inward force of the dynamic load has been opposed, fluid within the second pressure chamber 155 leaks to the engine through the second axially extending bore 102c or through the volume reducer 153. This leakage reduces the mean pressure present within the second pressure chamber 155.

It should be noted that at all operating conditions, the pressure in the second pressure chamber 155 will pump up to maintain a minimum preload in the second piston spring 151. When the force or preload in the second piston spring 151 gets too low, the third piston 152 moves out from the housing, due to the third piston spring 154 and pressure in the second pressure chamber 155 and draws more oil in through the inlet check valve 107.

Therefore, the first piston 103 in the first axially extending bore 102a provides the dominant damping of the chain span or belt and the second piston 150 in the second axially extending bore 102c provides the dominant and automatically adjusting spring force. The tensioner of the present invention automatically adjusts the mean tension force to keep the chain tension as low as possible without sacrificing chain control, significantly improving drive efficiency at new chain conditions and conditions with dynamic loads.

Figure 4A:
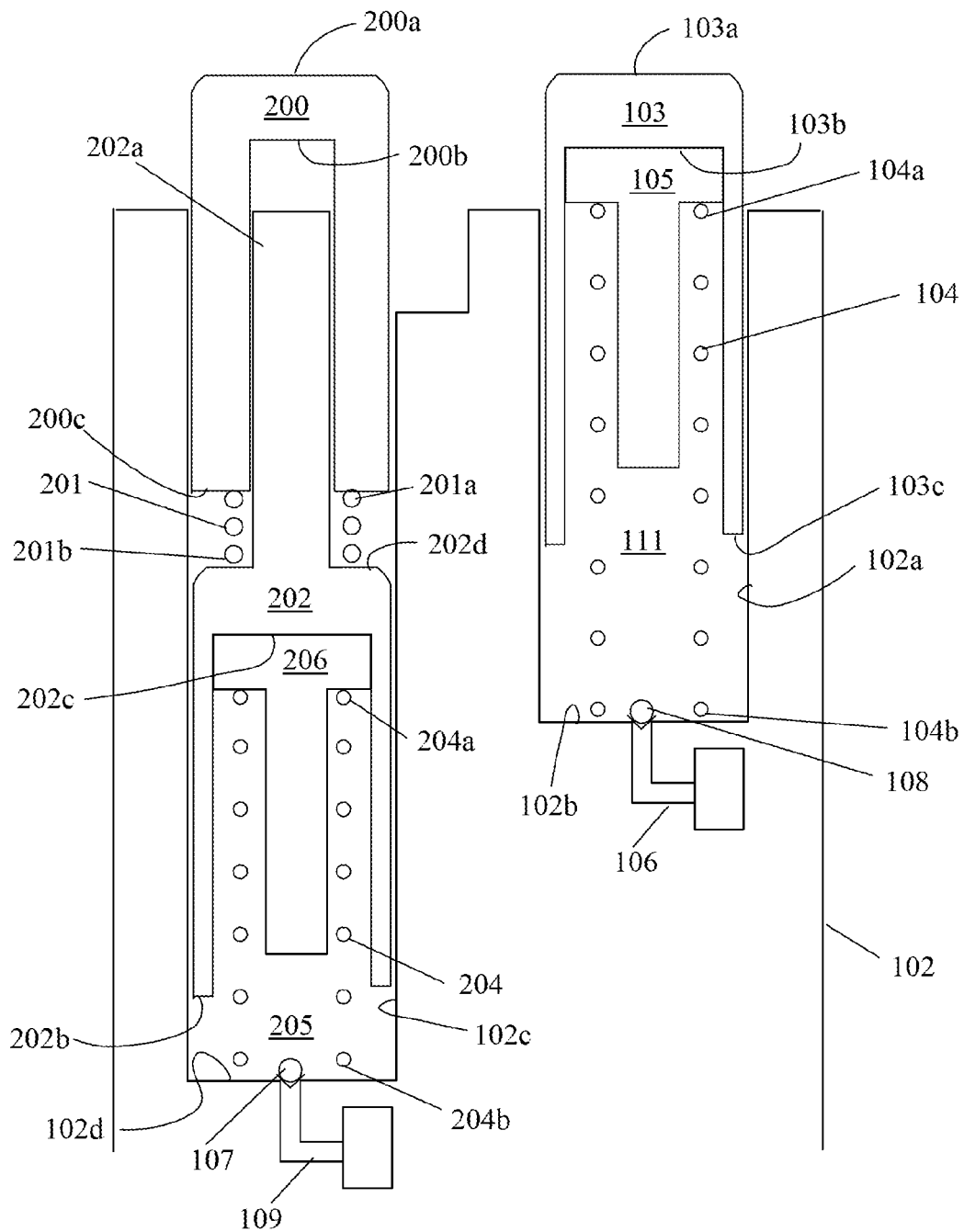
FIG. 4a shows a schematic of a tensioner of a fourth embodiment tensioning a chain under normal operating conditions.
Figure 4B:
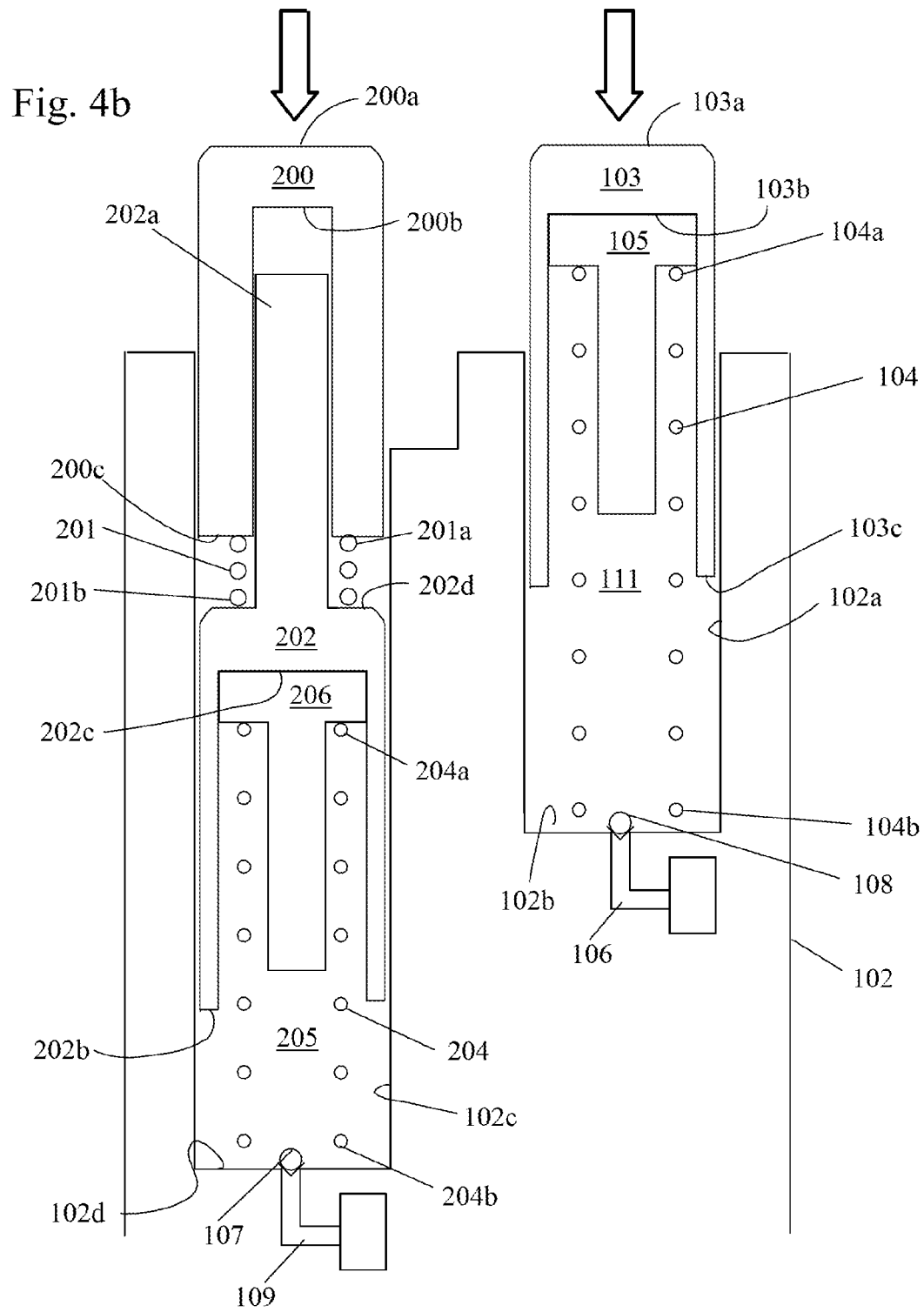
FIG. 4b shows a schematic of a tensioner tensioning a chain in response to high dynamic load.

FIGS. 4a-4b shows a tensioner of a fourth embodiment using passive control to tension a chain under various conditions; FIG. 4a is tensioning a chain without high loads; and FIG. 4b is tensioning a chain with high load.

The tensioner includes a housing 102 having a first axially extending bore 102a parallel to a second axially extending bore 102b. While the second bore 102c of the housing 102 is shown as being parallel to the first bore 102a, the second bore 102c may be perpendicular to the first bore 102a or at some other angle relative to the first bore 102a.

Slidably received within the first axially extending bore 102a is a first piston 103. The first piston 103 has a body with a first end 103a, a second end 103c, and a hollow interior 103b. Present within the hollow interior 103b of the first piston 103 is a first piston spring 104. The first piston spring 104 has a first end 104a in contact with the interior 103b of the first piston 103 or a volume reducer 105 and a second end 104b in contact with a bottom 102b of the first axially extending bore 102a of the housing 102. A first pressure chamber 111 is formed between the first piston 103 and the first axially extending bore 102a. Fluid is supplied to the first pressure chamber through a first supply 106 through an inlet check valve 108. The first piston 103 is biased outwards from the housing 102 to bias the chain through the first end 103a of the first piston 103 by the force of the first piston spring 104 and the pressure of oil in the first pressure chamber 111.

Alternatively, the first piston 103 may not be hollow and the first piston spring 104 would contact the body of the first piston 103 and the bottom 102b of the first axially extending bore 102a.

The second axially extending bore 102b slidably receives a second piston 200. The second piston 200 has a body with a first end 200a, a second end 200c and a hollow interior 200b. The hollow interior 200b receives a shaft 202a of a "Y" shaped internal piston 202. The shaft 202a of the Y-shaped internal piston 202 is connected to a body with a first end 202d, a second end 202b and a hollow interior 202c. Between the second end 200c of the second piston 200 and the first end 202d of the body of the internal piston 202d is a second piston spring 201. The second piston spring 201 has a first end 201a in contact with the second end 200c of the second piston 200 and a second end 201b in contact with the first end 202d of the internal piston 202. The second piston spring 201 biases the second piston 200 outwards from the housing 102.

Alternatively, the second piston spring may be present between the shaft 202a of the Y-shaped internal piston 202 and the hollow interior 200b of the second piston 200.

Within the hollow interior 202c of the internal piston 202 is an internal piston spring 204. The internal piston spring 204 has a first end 204a in contact a hollow interior 202c of the internal piston 202 or a volume reducer 206 and a second end 204b in contact with the bottom 102d of the second axially extending bore 102c. The internal piston spring 204 biases the internal piston 202 outwards from the housing 102, biasing the second piston 200 outwards from the housing by changing the preload on the second piston spring 201. In other words, moving the second end 201b of the second piston spring 201 outwards from the housing 102.

A second high pressure chamber 205 is formed between the hollow interior 202c of the internal piston 202 and the bottom 102d of the second axially extending bore 102c of the housing 102. Fluid is supplied to the second pressure chamber 205 through an inlet supply 109 and preferably a check valve 107. The inlet line 109 may or may not be connected to the inlet supply line 106.

The second piston spring 201 has a greater spring rate or spring constant than the first piston spring 104 and the internal piston spring 204.

Since there are two pistons 200, 103 to tension the chain span or belt, the leakage of the first pressure chamber 111 can be increased (as opposed to a conventional hydraulic tensioner where a certain mean pressure must be maintained within the pressure chamber to control the chain) to provide additional damping. The mean force required for chain control is supplied by the second piston 200 in the second axially extending bore 102c.

When the tensioner is tensioning a new chain as shown in FIG. 4a, during operation, fluid is supplied to the first pressure chamber 111 from the first inlet supply 106 and through an inlet check valve 108 and biases the first piston 103 outwards from the housing 102 in addition to the spring force of the first piston spring 104, biasing a span of the closed loop chain 400 or belt as shown in FIG. 7. At the same time, the second piston 200 is also biased outwards from the second axially extending bore 102c by the second piston spring 201 to bias a span of the closed loop chain or belt. Ideally, the first piston 103 and the second piston 200 are biased outwards from the housing 102 approximately the same amount. In other words, the first ends 103a, 200a of the first and the second pistons 103, 200 are aligned as shown in FIGS. 4a and 7.

When the tensioner is tensioning a worn chain without high load, during operation, fluid is supplied to the first pressure chamber 111 through the first inlet supply 106 and through an inlet check valve 108 and biases the first piston 103 outwards from the housing 102 in addition to the spring force of the first piston spring 104, biasing a span of the closed loop chain 400 or belt. At the same time, the second piston 200 is also biased outwards further through the second piston spring 201 due to the movement of the internal piston 202 by the internal piston spring 204 to bias the span of the closed loop chain 400 or belt. As the chain wears, additional slack is present in the chain span and the first piston 103 and second piston 200 would need to be extended further outwards from the housing 102 to bias and adequately tension the chain 400.

When the tensioner is tensioning a chain during high dynamic chain load, the high dynamic load force from the chain (shown by the arrow) pushes the first piston 103 and the second piston 200 inwards towards the housing 102 and then outwards from the housing 102, pumping up the pressure or pressurizing the second pressure chamber 205, by drawing fluid through the inlet check valve 107 in the second bore 102c of the housing 102. The pressurization of the second pressure chamber 205 in the second bore 102c moves the internal piston 202 outwards from the housing 102. The movement of the internal piston 202 causes the first end 202d of the internal piston 202 to exert an outward force on the second piston 200 through the second piston spring 201, opposing the inward force of the dynamic load.

Once the inward force of the dynamic load has been opposed, fluid within the second pressure chamber 205 leaks to the engine through the second axially extending bore 102c or through the volume reducer 206. This leakage reduces the mean pressure present within the second pressure chamber 205.

It should be noted that at all operating conditions, the pressure in the second pressure chamber 205 will pump up to maintain a minimum preload in the second piston spring 201. When the force or preload in the second piston spring 201 gets too low, the internal piston 202 moves out from the housing, due to the internal piston spring 204 and pressure in the second pressure chamber 205 and draws more oil in through the inlet check valve 107.

Therefore, the first piston 103 in the first axially extending bore 102a provides the dominant damping of the chain span or belt and the second piston 200 in the second axially extending bore 102c provides the dominant and automatically adjusting spring force. The tensioner of the present invention automatically adjusts the mean tension force to keep the chain tension as low as possible without sacrificing chain control, significantly improving drive efficiency at new chain conditions and conditions with dynamic loads.

Figure 5:
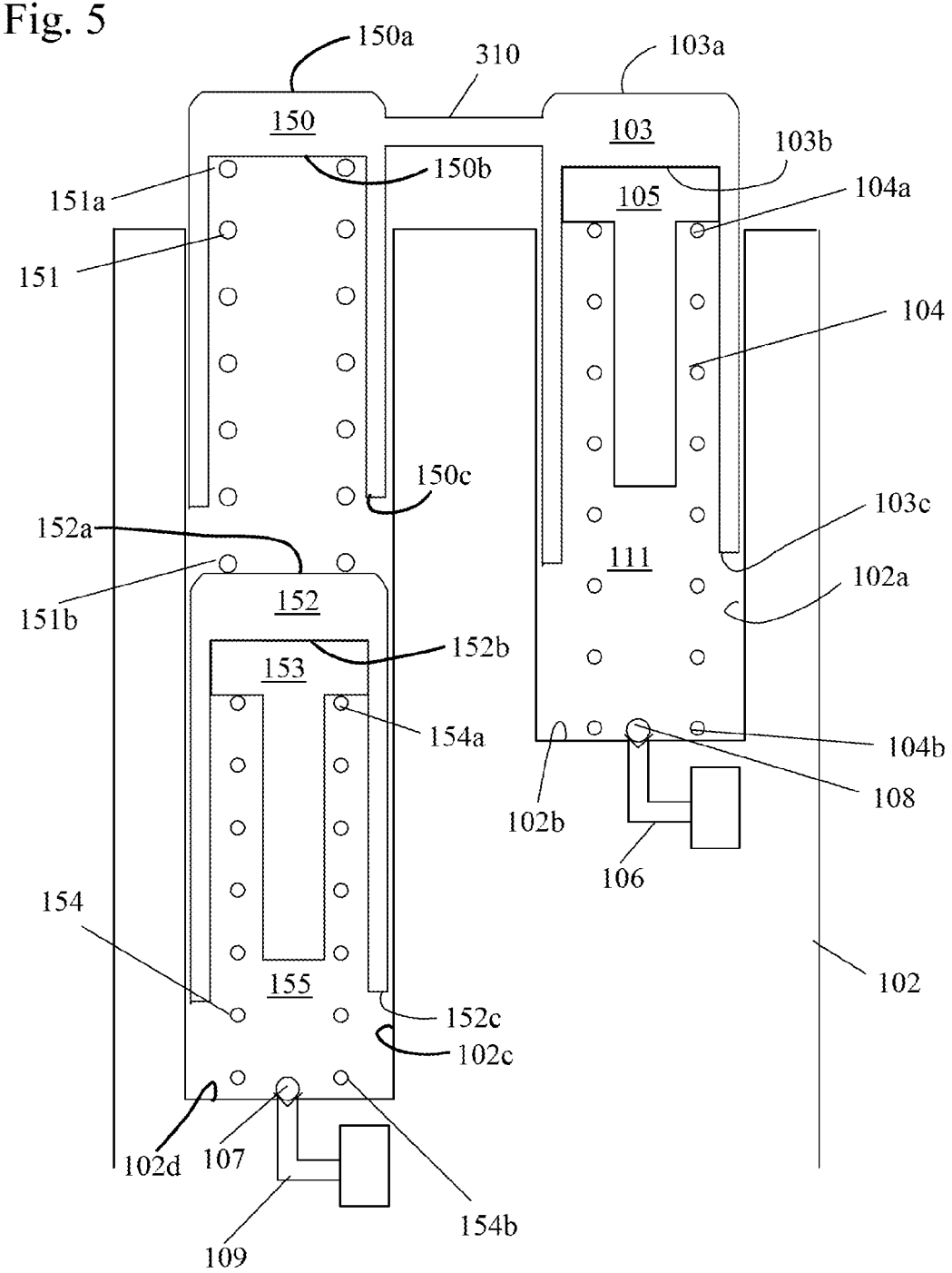
FIG. 5 shows a schematic of a first piston in a first bore connected to a second piston in a second bore.
Figure 6:
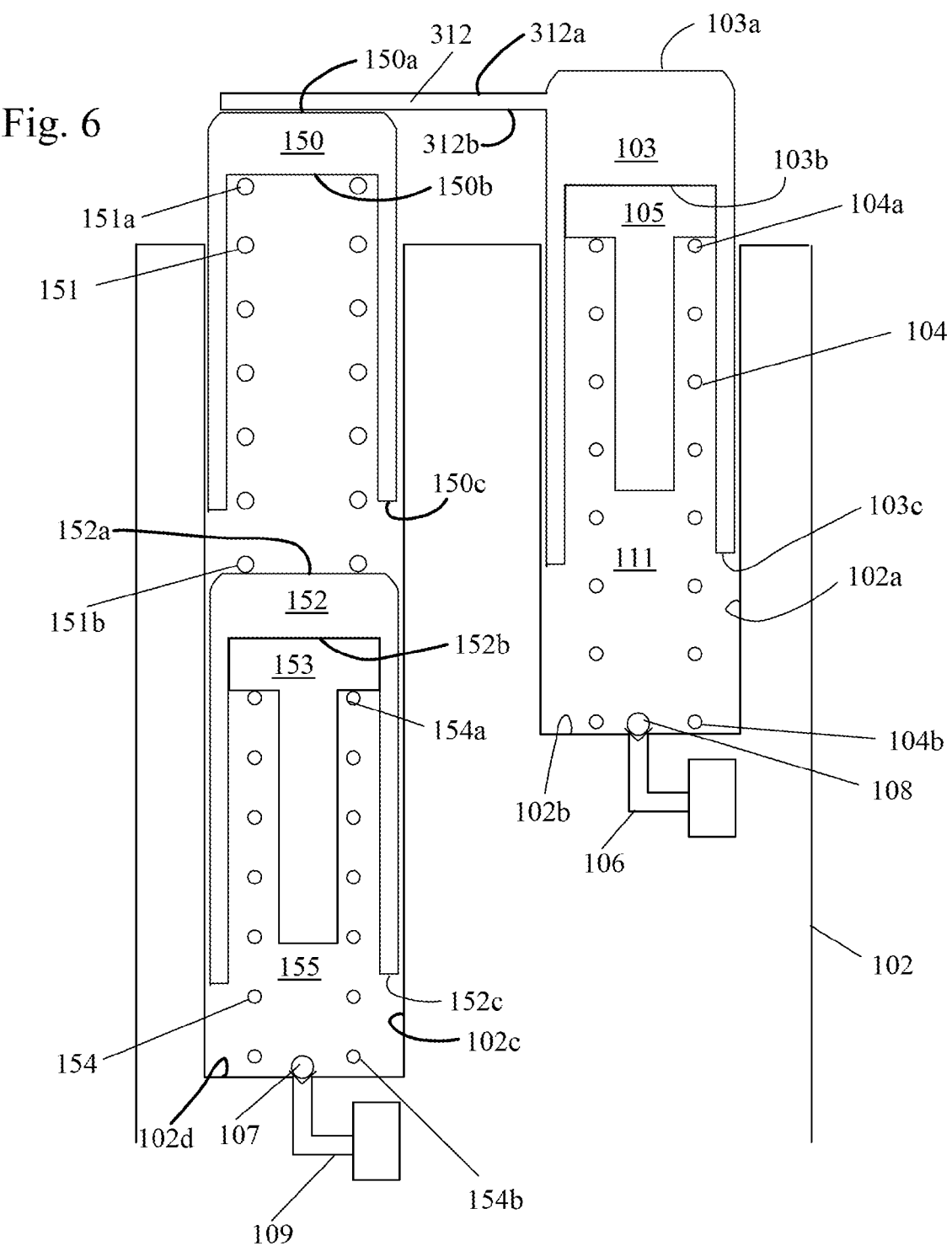
FIG. 6 shows a schematic of a second piston in a second bore moving a first piston in a first bore through an extension of the first piston.

FIGS. 5-6 show different options for simultaneously controlling the first piston and the second piston of the embodiments of the present invention. Referring to FIG. 5, the first piston 103 and the second piston 150 are directly attached through a linkage 310. Therefore, the movement of the first piston 103 and the second piston 150 are tied to each other. When the first piston 103 and the second piston 150 are coupled, the first piston spring 104 is optional. It should be noted that while the linkage was shown with the tensioner of the third embodiment, it can similarly be applied to the tensioners of FIGS. 2a-2b and 4a-4b.

FIG. 6 shows an alternate configuration in which the first piston has an extension 312 with a top surface 312a and a bottom surface 312b. The bottom surface 312b of the extension 312 is pushed on by the second piston 150 as the second piston 150 is biased outwards from the housing 102. It should be noted that while the linkage was shown with the tensioner of the third embodiment, it can similarly be applied to the tensioners of FIGS. 2a-2b and 4a-4b. In this embodiment, the first piston spring 104 is optional.

The volume reducers shown in any of the above embodiments may be replaced with a pressure relief valve or vent.

It should also be noted that the tensioner of FIGS. 2a-2b is shown in FIG. 7, however any of the tensioners present in the application would work with the chain span.

In any of the above embodiments, the external first pistons and second pistons may have grooves on an outer circumference that engage and ratchet with a pawl or ratchet clip as known in the art.

Accordingly, it is to be understood that the embodiments of the invention herein described are merely illustrative of the application of the principles of the invention. Reference herein to details of the illustrated embodiments is not intended to limit the scope of the claims, which themselves recite those features regarded as essential to the invention.

What is claimed is:

1. A tensioner for a passive tensioner system tensioning a span of chain or a belt comprising:
   a housing having a first axially extending bore with a first fluid input and a second axially extending bore with a second fluid input;
   a first piston slidably received by the first axially extending bore, the first piston comprising a body having a first end and a second end;
   a first pressure chamber for biasing the first piston outwards from the housing, defined between the first piston and the first axially extending bore and in fluid communication with the first fluid input;
   a second piston slidably received within the second axially extending bore, the second piston comprising a body having a first end and a second end;
   a third piston slidably received within the second axially extending bore, the third piston comprising a body having a first end with a top surface and a second end;
   a second piston spring received in the second axially extending bore, the second piston spring having a first end in contact with the second piston and a second end in contact with the top surface of the third piston;
   a third piston spring received in the second axially extending bore, the third piston spring having a first end in contact with the third piston and a second end in contact with the second axially extending bore;
   a second pressure chamber defined between the third piston and the second axially extending bore, in fluid communication with the second fluid input; and
   a check valve between the second pressure chamber and the second fluid input;
   wherein when dynamic load from the chain or belt moves the first piston and the second piston inwards and outwards from the housing, fluid from the second fluid input is drawn into the second pressure chamber through the check valve, creating a fluid pressure in the second pressure chamber, causing the third piston to move outwards from the housing and exert an outward force on the second piston through the second piston spring, opposing an inward force of the dynamic load.

2. The tensioner of claim 1, wherein the body of the second piston further comprises an open end at the second end and a closed end at the first end, a bottom surface at the open end, a top surface at the closed end, and a hollow interior having an inner diameter.

3. The tensioner of claim 2, wherein the second piston spring is received by the hollow interior of the second piston, the second piston spring having a first end in contact with the hollow interior of the second piston.

4. The tensioner of claim 1, wherein the body of the third piston further comprises an open end at the second end and a closed end at the first end, a bottom surface at the open end, and a hollow interior having an inner diameter.

5. The tensioner of claim 4, wherein the third piston spring is received by the hollow interior of the third piston, the third piston spring having a first end in contact with the hollow interior of the third piston.

6. The tensioner of claim 1, wherein the first piston and the second piston are coupled for movement together.

7. The tensioner of claim 6, wherein the first piston and the second piston are coupled for movement together by coupling the body of the first piston and the body of the second piston.

8. The tensioner of claim 6, wherein the first piston further comprises an extension having a top surface and a bottom surface, wherein the second piston pushes on the bottom surface of the first extension, coupling the second piston to the first piston for movement together.

9. The tensioner of claim 6, wherein the coupling is flexible.

10. The tensioner of claim 6, wherein the coupling is rigid.

11. The tensioner of claim 1, wherein the body of the first piston further comprises an open end at the second end and a closed end at the first end, a bottom surface at the open end, a top surface at the closed end, and a hollow interior having an inner diameter.

12. The tensioner of claim 11, further comprising a first piston spring received within the hollow interior of the first piston, for biasing the first piston outwards from the housing, the first piston spring having a first end contacting the hollow interior of the first piston and a second end contacting the first axially extending bore.

13. The tensioner of claim 12, wherein the second piston spring has a greater spring constant than the first piston spring and the third piston spring.

14. The tensioner of claim 11, further comprising a volume reducer received by the hollow interior of the first piston.

15. The tensioner of claim 1, further comprising a first piston spring for biasing the first piston outwards from the housing, the first piston spring having a first end contacting the second end of the first piston and a second end contacting the first axially extending bore.

16. The tensioner of claim 1, further comprising a vent for venting fluid from the first pressure chamber.

17. The tensioner of claim 1, wherein the first fluid input and the second fluid input are connected to the same fluid supply.

18. The tensioner of claim 1, wherein the first fluid input and the second fluid input are connected to different fluid supplies.

19. The tensioner of claim 1, wherein the first bore is parallel to the second bore.

20. The tensioner of claim 1, wherein the first bore is perpendicular to the second bore.

* * * * *